United States Patent
Samaniego et al.

(10) Patent No.: US 8,798,359 B2
(45) Date of Patent: Aug. 5, 2014

(54) SYSTEMS AND METHODS FOR IMAGE SHARPENING

(71) Applicant: Raytheon Company, Waltham, MA (US)

(72) Inventors: Raymond Samaniego, Coppell, TX (US); Jerry Michael Grimm, Plano, TX (US)

(73) Assignee: Raytheon Company, Waltham, MA (US)

( * ) Notice: Subject to any disclaimer, the term of this patent is extended or adjusted under 35 U.S.C. 154(b) by 70 days.

(21) Appl. No.: 13/714,945

(22) Filed: Dec. 14, 2012

(65) Prior Publication Data

US 2013/0216151 A1    Aug. 22, 2013

Related U.S. Application Data

(60) Provisional application No. 61/601,208, filed on Feb. 21, 2012.

(51) Int. Cl.
G06K 9/62 (2006.01)
G06K 9/40 (2006.01)
G06K 9/00 (2006.01)

(52) U.S. Cl.
USPC ........................................... 382/159; 382/224

(58) Field of Classification Search
USPC ......... 382/159, 181, 190, 224, 255, 276, 312; 706/40
See application file for complete search history.

(56) References Cited

U.S. PATENT DOCUMENTS

| | | | |
|---|---|---|---|
| 5,383,457 A | 1/1995 | Cohen | |
| 5,394,151 A | 2/1995 | Knaell et al. | |
| 5,842,191 A * | 11/1998 | Stearns | 706/40 |
| 7,207,943 B2 | 4/2007 | Barnes et al. | |
| 7,215,277 B2 | 5/2007 | Woodford et al. | |
| 7,864,101 B2 | 1/2011 | Samaniego et al. | |
| 7,898,468 B2 | 3/2011 | Samaniego et al. | |
| 8,582,871 B2 * | 11/2013 | Skipper et al. | 382/159 |
| 8,687,880 B2 * | 4/2014 | Wei et al. | 382/159 |
| 2005/0232512 A1 * | 10/2005 | Luk et al. | 382/276 |
| 2007/0127811 A1 * | 6/2007 | Luo | 382/159 |
| 2011/0148691 A1 | 6/2011 | Samaniego et al. | |
| 2013/0216151 A1 * | 8/2013 | Samaniego et al. | 382/255 |

OTHER PUBLICATIONS

Anderson, Michael D., "Resolution in Radar Mapping," Master's Thesis, Mar. 1, 1993, retrieved from the internet: http://www.dtic.mil/cgi-bin/GetTRDoc?AD=ADA69730 (retrieved on Oct. 8, 2013), 90 pages.

Kragh, Thomas J., "Minimum-Entropy Autofocus for Three-Dimensional SAR Imaging," Proc. of SPIE vol. 7337, Algorithms for Synthetic Aperture Radar Imagery XVI, Apr. 28, 2009, 11 pages.

* cited by examiner

*Primary Examiner* — Amir Alavi
(74) *Attorney, Agent, or Firm* — Lando & Anastasi, LLP

(57) ABSTRACT

A method of generating an image comprises accessing a dataset gathered from a sensor system and generating, from the dataset, a first image including a plurality of image elements. The method further includes generating a training image by combining the dataset with known sensor responses and generating a weighting factor by correcting the training image in view of the known sensor responses. The method further includes applying the weighting factor to one of the plurality of image elements to form a weighted image element.

20 Claims, 2 Drawing Sheets

SYSTEMS AND METHODS FOR IMAGE SHARPENING

CROSS REFERENCE TO RELATED APPLICATIONS

This application claims priority under 35 U.S.C. §119(e) to U.S. Provisional Application No. 61/601,208 filed Feb. 21, 2012 and titled "SYSTEMS AND METHODS FOR IMAGE SHARPENING," which is hereby incorporated herein by reference in its entirety.

BACKGROUND

Radars detect targets by transmitting a beam of electro-magnetic energy toward the target and measuring the electro-magnetic energy reflected from the target. Synthetic aperture radar (SAR) is a signal processing technique that may be implemented for use with radars to form imagery by processing reflected electro-magnetic energy acquired at differing orientations and positions relative to the target. Imagery generated by synthetic aperture radars are often used for detection of objects that may be otherwise difficult to obtain using other imagery generating devices such as video cameras that generate imagery using visible light. Conventional radar imaging systems and image processing techniques often generate distortions and artifacts such as sidelobes and aliasing, and therefore, are not entirely satisfactory in all respects.

SUMMARY OF THE INVENTION

Aspects and embodiments are directed to methods and apparatus for automatically suppressing elevation sidelobes in three dimensional (3D) synthetic aperture radar (SAR) imagery using sparse (efficient) collections. Elevation impulse response sidelobes can blur an image to the point that features are not readily extracted using automated algorithms, particularly when the elevation aperture is sparse and under-sampled. Aspects and embodiments provide an elevation sharpening method that uses independent voxel-by-voxel weighting based on statistics of a back-projected signal from antenna element to antenna element in a SAR array. As discussed further below, according to certain embodiments, phase and amplitude variations, or noise estimates (per voxel) are used to deweight returns from sidelobes and/or aliasing by forming 3D volumes from every elevation sample and then combining the returns coherently with the weighting. This method allows for remote radar-based 3D imaging of building interiors, and the ability to extract useful features from the imagery.

According to one embodiment, a method of generating an image comprises accessing a dataset gathered from a sensor system, generating, from the dataset, a first image including a plurality of image elements, generating a training image by combining the dataset with known sensor responses, generating a weighting factor by correcting the training image in view of the known sensor responses, and applying the weighting factor to one of the plurality of image elements to form a weighted image element.

In one example of the method the sensor system is a radar system. The plurality of image elements may include a plurality of voxels. In one example, the known sensor responses include known three-dimensional responses. In another example the known sensor responses include known point target responses. The step of generating a weighting factor may include generating a plurality of weighting coefficients for weighting an amplitude parameter of at least one of the plurality of image elements. The step of generating a weighting factor may include generating a plurality of weighting coefficients for weighting a phase parameter of at least one of the plurality of the image elements. The method may further comprise accessing a second dataset gathered from the sensor system, generating, from the second dataset, a second image including a second plurality of image elements, applying the weighting factor to one of the second plurality of image elements to form a second weighted image element, and combining the weighted image elements into a combined image.

According to another embodiment an image generation system comprises a sensor processor operable to access a dataset gathered from a sensor system, generate, from the dataset, a first image including a plurality of image elements, generate a training image by combining the dataset with known sensor responses, generate a weighting factor by correcting the training image in view of the known sensor responses, and apply the weighting factor to one of the plurality of image elements to form a weighted image element.

In one example the sensor system includes a radar system operable to gather a plurality of radar datasets. In one example the known sensor responses include known three-dimensional responses. In another example the known sensor responses include known point target responses. The sensor processor may be further operable to generate the weighting factor by generating a plurality of weighting coefficients for weighting an amplitude parameter of at least one of the plurality of image elements. The sensor processor may be further operable to generate the weighting factor by generating a plurality of weighting coefficients for weighting a phase parameter of at least one of the plurality of the image elements. In one example the sensor processor is further operable to access a second dataset gathered from the sensor system, generate, from the second dataset, a second image including a second plurality of image elements, apply the weighting factor to one of the second plurality of image elements to form a second weighted image element, and combine the weighted image elements into a combined image.

According to another embodiment, a synthetic aperture radar (SAR) image generation method comprises accessing a dataset gathered from a SAR system, generating, from the dataset, a first 3D image including a plurality of image voxels, generating a training image by combining the dataset with training SAR responses, deriving one or more weighting coefficients by correcting the training image in view of the training SAR responses, determining a weighting factor based on at least one property of the dataset and the one or more weighting coefficients, and applying the weighting factor to one of the plurality of image elements to form a weighted image element.

In one example of the method the training SAR responses are point responses. In another example the training SAR responses are 3D responses. Deriving one or more weighting coefficients by correcting the training image in view of the training SAR responses may include minimizing at least one sidelobe in the training image. In one example the at least one property of the dataset is a phase variance. In another example the at least one property of the dataset is an amplitude variance.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a method of elevation image sharpening that allows for the exploitation of 3D images from efficiently-sampled datasets. In particular, aspects and embodiments provide a method by which 3D imagery is formed from multiple sensors or antennas, using a weighting scheme in which weights are applied voxel by voxel, to coherently combine multiple 3D images into one final image. As discussed further below, phase and amplitude variations or noise estimates (per voxel) are used to deweight returns from sidelobes and/or aliasing, thereby suppressing sidelobes in the final image. The weights used to combine the individual 3D images into the one final image are determined from training using known results. This approach allows for training of coefficients to match the overall system response, and does not suppress weak features while de-weighting the sidelobes. The methods disclosed herein evolved from a monopulse elevation beam sharpening technique which is generalized for the application of N receiver channels, where N>2. The concept of using phase in monopulse to sharpen the resulting beam (elevation response) is extended as disclosed herein to using amplitude and phase statistics to accomplish similar objectives with more than two channels.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
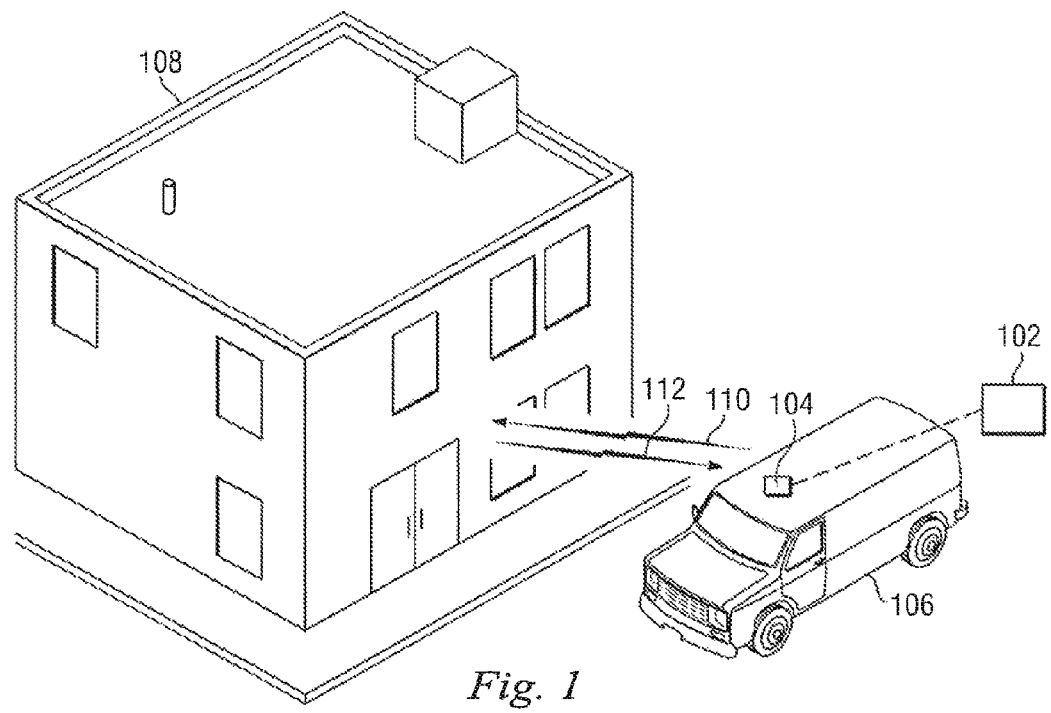
FIG. 1 is an illustration showing an example of a radar imaging system according to aspects of the present invention.

Referring to FIG. 1, there is illustrated an example of an environment in which a radar imaging system according to various embodiments may be used. The radar imaging system may include an image processing system 102 communicating with a radar system 104. In one embodiment, the radar system 104 is mounted on a movable platform such as a truck 106 or other vehicle, for example. In alternative embodiments, the radar system may be mounted or an air, space or water based movable platform, or may be located on a stationary platform. The radar system 104 generates electromagnetic energy 110 that may be reflected from a target of interest 108 and the surrounding terrain. The radar system 104 is also configured to receive reflected electromagnetic energy 112 from the target of interest 108 and the surrounding terrain. Single or multi-channel receivers may be used. The reflected energy or pulses 112 are converted into data that is sent to the image processing system 102 to be processed into images of the target of interest 108 and the surrounding terrain. In this embodiment, the target of interest may be a building. In alternative embodiments, the target of interest may be any type of point or moving target in an environment of interest.

Some radar systems may be operated in a synthetic aperture radar (SAR) mode. The synthetic aperture radar (SAR) mode combines reflected pulses at differing locations to form an image of a region or one or more targets of interest. The pulses may be combined by separating information in each image according to its frequency and range components. Some radars may also be operated in an inverse synthetic aperture radar (ISAR) mode in which the radar receives multiple pulses from one or more moving targets.

Imagery generated by radars using SAR and ISAR processing techniques may provide certain benefits over other imagery generating devices. For example, radars typically acquire information using electro-magnetic energy reflected from targets of interest. Upon reflection, electro-magnetic energy penetrates into objects to a certain degree according to the principle of penetration depth. The penetration depth of electro-magnetic energy is based upon several factors including the frequency of electro-magnetic energy, conductivity of the object, and the density of the target. Knowledge of these factors when processing reflected electro-magnetic energy may be used to derive useful information about internal features of targets. Thus, reflected electro-magnetic energy may include information about features internal to targets that is not typically obtained using conventional imagery generating devices, such as video cameras that generate imagery using visible light.

In some cases, it may be useful to determine internal features of static structures such as buildings. In some intelligence, surveillance, and reconnaissance activities for example, it would be useful to generate three-dimensional imagery of buildings or other structures that may be situated in metropolitan or other civilian regions. Although SAR and ISAR devices have been proposed for this purpose, the quality and resolution of imagery has been limited by the ability suppress sidelobes, aliasing, and other distortions. When the elevation aperture is sparse and undersampled as may be the case with efficient data collection techniques, traditional automated algorithms that rely exclusively on non-adaptive channel weighting may not sufficiently extract imaged features and suppress sidelobes, aliasing or other distortions.

Figure 2:
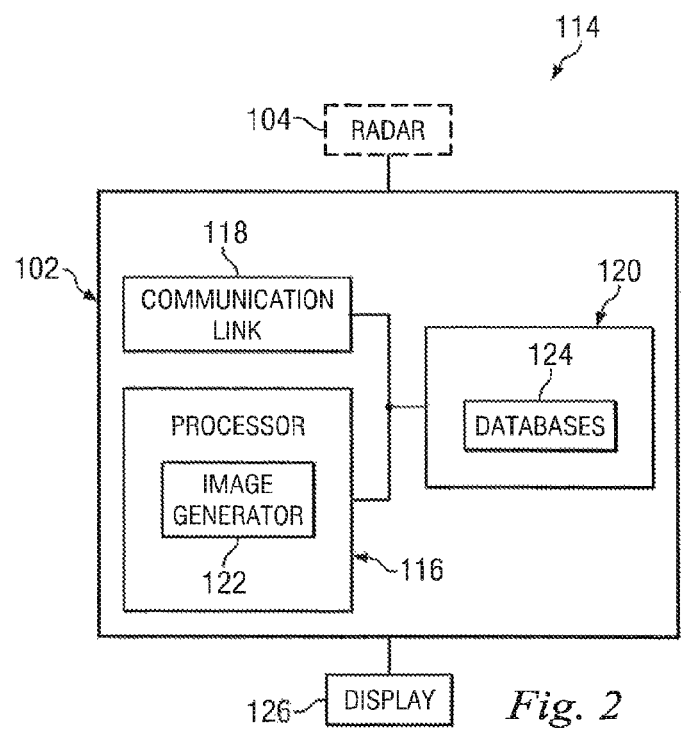
FIG. 2 is a schematic diagram of one example of a radar imaging system according to aspects of the present invention.

FIG. 2 is a schematic diagram of a radar imaging system 114 according to one embodiment of the present disclosure.

As previously described, the radar system 104 communicates with the image processing system 102. The image processing system 102 is a computing system comprising a processor 116, a communication link 118, and a memory 120. The processor 116 includes an image generator 122 and the memory 120 one or more databases 124 for storing, for example, known radar responses, images and other datasets compiled from the radar system 104. The radar imaging system 114 also may include a display system 126. The image generator 122 includes instructions stored in the memory 120 and executable by the processor 116 of image processing system 102. The image processing system 102 may be any suitable computing system to provide imagery on the timeline required, such as a network coupled computing system or a stand-alone computing system. Examples of stand-alone computing systems may include a personal computer, a personal digital assistant, a smartphone, a laptop computer, or a mainframe computer. A network computing system may be a number of computers coupled together via a network, such as a local area network (LAN), a metropolitan area network (MAN), or a wide area network (WAN), such as the internet, that collectively execute the instructions of the image generator 122. The communication link 118 may support wired or wireless communication.

Figure 3:
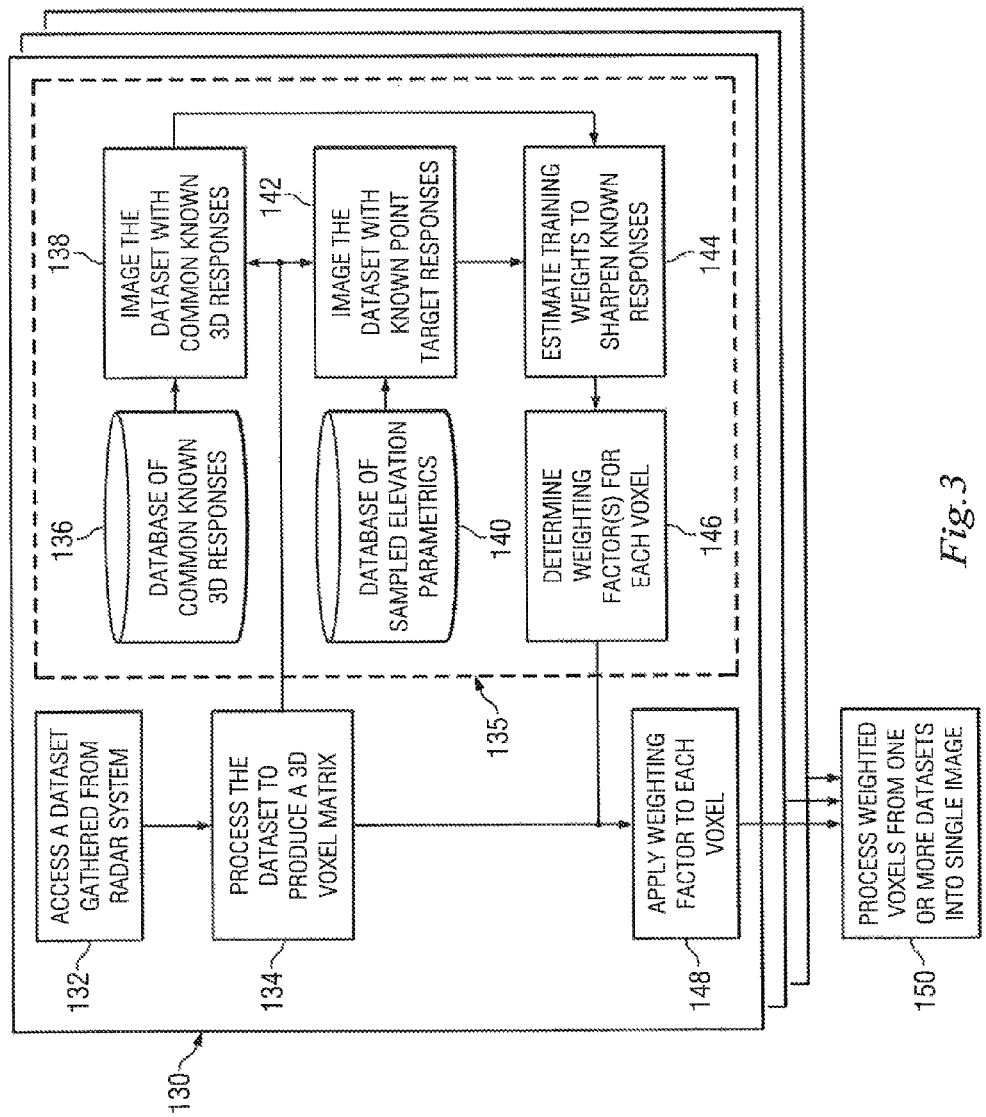
FIG. 3 is a flow chart showing an example of a method of generating an image according to aspects of the present invention.

FIG. 3 is flow chart showing a method 130 of generating an image according to one embodiment of the present disclosure. The method 130 may be implemented, for example, on the image processing system 102. At step 132, a dataset that was gathered from a radar system, such as radar system 104, may be accessed, for example from a database 124. In addition to echo data received from radar system 104, the accessed dataset may include identifying information about the dataset such as the target area geolocation, the radar kinematics, path of travel, and other relevant information about the sensors and/or information about the antennas required to form imagery. At step 134, the accessed dataset may be processed to produce a matrix of image elements. Any known image reconstruction methods may be used to produce the matrix of image elements, including for example, backprojection. The image elements may be either pixels for two-dimensional images or voxels for three-dimensional images.

A training subprocess 135 may be performed to identify training weights that may be applied to each image element to reduce sidelobes, aliasing, and other distortions in the image matrix. The training subprocess 135 may access known training responses associated with a particular radar 104. A database 136 may include "truth information" or common known two- or three-dimensional responses. For example, predetermined three-dimensional responses corresponding to known features of structural components, weapons, vehicles, aircraft, or other types of structures or technology may be stored in the database 136. Known three-dimensional responses may be constructed from numerical simulation of various features of interest or from precision measured data.

The training subprocess 135 may additionally or alternatively include accessing a database 140 that includes parametrics associated with sampled elevation datasets. Dataset parametrics may include the spacing of the receivers in units of wavelengths in order to assess the expected amount of aliasing.

At step 138, the dataset accessed at step 132 may be imaged with one or more known three dimensional responses from the database 136. Alternatively or additionally, at step 142, the dataset may be imaged with known point target responses, disposed in a similar manner as how scattering features are observed by the radar, based on simulations from the database 140. In one example, point targets are simulated as perfect omni-directional reflectors at various x, y, z locations with respect to the radar. Derived point target responses may then only contain impurities associated with the radar and the desired collection geometry.

At step 144, training weights or coefficients are determined for sharpening the known point target or three dimensional structure responses. Sharpening the known responses includes reducing sidelobes, aliasing, and other distortions associated with the known responses. Because the known responses correspond to know structural and target characteristics, distortions may be more easily identified and corrected. For example, training weights or coefficients may be determined to restore an image point response (IPR) for the known point responses. The training weights may be selected to match and effectively deconvolve the overall system response. In one example, only one set of coefficients is derived. A set of coefficients may be derived from a blending of the known system responses and the point target responses.

At step 146, one or more beam sharpening or weighting factors may be calculated for each image element to deweight those image elements associated with sidelobes, aliasing, or other distortions. In one embodiment, the empirically derived training weights from step 144 for a particular three dimensional voxel element may be, for example,

P1=0.50
P2=1.25
P3=1.75
P4=0.75

The voxel element weighting factor or beam sharpening factor may be expressed as follows:

$$\text{Weighting Factor} = [(1-(12*\sigma_p^2/4/\pi^2)^{P1})^{P2}]/[(1+(\sigma_A^2/\mu_A^2)^{P3})^{P4}], \text{ where}$$

$\sigma_p^2$=Phase variance across receivers
$\sigma_A^2$=Amplitude variance across receivers
$\mu_A$=Amplitude mean across receivers A Weighting Factor of 1 may indicate that the voxel should be identified as corresponding to a real target rather than corresponding to a distortion. This is because a Weighting Factor of 1 may indicate a low phase and amplitude variance associated with a real target. Distortions may have a higher phase and/or amplitude variance.

At step 148, the weighting factor developed in step 146 is applied to each of the image elements in the matrix of image elements to create a sharpened image with deweighted sidelobes, aliasing, and other distortions. The process steps 132-148 may be repeated for each of the remaining datasets corresponding to different elevations, different radar paths and directions, different sensors, and/or different antennas. At step 150, the sharpened images associated with each dataset may be processed into a single image. The training subprocess 135 may be executed any time the system is modified or the environment, including heat and/or humidity, changes. Also, at system start-up, an automatic calibration program may be initiated.

Although the described distortion reduction system and technique may be suitable for radar imaging as described, other types of imaging may also benefit from the use of real and simulated data to improve the quality of the imaging. Other types of three dimensional imaging techniques that use multiple sensors, such as medical, commercial, subsurface, sonar, satellite, and other imaging technologies may benefit from the use of the described image sharpening methods.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of generating an image comprising:
   accessing a dataset gathered from a sensor system;
   generating, from the dataset, a first image including a plurality of image elements;
   generating a training image by combining the dataset with known sensor responses;
   generating a weighting factor by correcting the training image in view of the known sensor responses; and
   applying the weighting factor to one of the plurality of image elements to form a weighted image element.

2. The method of claim 1 wherein the plurality of image elements include a plurality of voxels.

3. The method of claim 1 wherein the known sensor responses include known three-dimensional responses.

4. The method of claim 1 wherein the known sensor responses include known point target responses.

5. The method of claim 1 wherein generating the weighting factor includes generating a plurality of weighting coefficients for weighting an amplitude parameter of at least one of the plurality of image elements.

6. The method of claim 1 wherein generating the weighting factor includes generating a plurality of weighting coefficients for weighting a phase parameter of at least one of the plurality of the image elements.

7. The method of claim 1 further comprising:
   accessing a second dataset gathered from the sensor system;
   generating, from the second dataset, a second image including a second plurality of image elements;
   applying the weighting factor to one of the second plurality of image elements to form a second weighted image element; and
   combining the weighted image elements into a combined image.

8. An image generation system comprising a sensor processor operable to:
   access a dataset gathered from a sensor system coupled to the image generation system;
   generate, from the dataset, a first image including a plurality of image elements;
   generate a training image by combining the dataset with known sensor responses;
   generate a weighting factor by correcting the training image in view of the known sensor responses; and
   apply the weighting factor to one of the plurality of image elements to form a weighted image element.

9. The image generation system of claim 8 wherein the sensor system includes a radar system operable to gather a plurality of radar datasets.

10. The image generation system of claim 8 wherein the known sensor responses include known three-dimensional responses.

11. The image generation system of claim 8 wherein the known sensor responses include known point target responses.

12. The image generation system of claim 8 wherein the sensor processor is further operable to generate the weighting factor by generating a plurality of weighting coefficients for weighting an amplitude parameter of at least one of the plurality of image elements.

13. The image generation system of claim 8 wherein the sensor processor is further operable to generate the weighting factor by generating a plurality of weighting coefficients for weighting a phase parameter of at least one of the plurality of the image elements.

14. The image generation system of claim 8 wherein the sensor processor is further operable to:
   access a second dataset gathered from the sensor system;
   generate, from the second dataset, a second image including a second plurality of image elements;
   apply the weighting factor to one of the second plurality of image elements to form a second weighted image element; and
   combine the weighted image elements into a combined image.

15. A synthetic aperture radar (SAR) image generation method comprising:
   accessing a dataset gathered from a SAR system;
   generating, from the dataset, a first 3D image including a plurality of image voxels;
   generating a training image by combining the dataset with training SAR responses;
   deriving one or more weighting coefficients by correcting the training image in view of the training SAR responses;
   determining a weighting factor based on at least one property of the dataset and the one or more weighting coefficients; and
   applying the weighting factor to one of the plurality of image elements to form a weighted image element.

16. The method of claim 15 wherein the training SAR responses are point responses.

17. The method of claim 15 wherein the training SAR responses are 3D responses.

18. The method of claim 15 wherein deriving one or more weighting coefficients by correcting the training image in view of the training SAR responses includes minimizing at least one sidelobe in the training image.

19. The method of claim 15 wherein the at least one property of the dataset is a phase variance.

20. The method of claim 15 wherein the at least one property of the dataset is an amplitude variance.

* * * * *